(12) United States Patent
Koizumi (10) Patent No.: US 10,728,745 B2
(45) Date of Patent: Jul. 28, 2020

(54) INFORMATION PROCESSING APPARATUS AND NON-TRANSITORY COMPUTER-READABLE MEDIUM RECORDING INFORMATION PROCESSING PROGRAM

(71) Applicant: SEIKO EPSON CORPORATION, Tokyo (JP)

(72) Inventor: Junpei Koizumi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/113,866

(22) Filed: Aug. 27, 2018

(65) Prior Publication Data
US 2019/0069166 A1    Feb. 28, 2019

(30) Foreign Application Priority Data

Aug. 28, 2017 (JP) ................ 2017-163069

(51) Int. Cl.
| | |
|---|---|
| *H04W 76/10* | (2018.01) |
| *H04W 8/24* | (2009.01) |
| *H04W 48/12* | (2009.01) |
| *G06F 3/12* | (2006.01) |
| *H04W 8/00* | (2009.01) |
| *H04W 48/18* | (2009.01) |

(52) U.S. Cl.
CPC ............ *H04W 8/24* (2013.01); *G06F 3/1204* (2013.01); *G06F 3/1206* (2013.01); *G06F 3/1226* (2013.01); *G06F 3/1236* (2013.01); *H04W 8/005* (2013.01); *H04W 48/12* (2013.01); *H04W 76/10* (2018.02); *G06F 3/1292* (2013.01); *H04W 48/18* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,392,585 | B1 * | 3/2013 | Balwani | H04L 43/0811 |
| | | | | 709/228 |
| 9,699,831 | B2 * | 7/2017 | Choi | H04W 88/04 |
| 2015/0142552 | A1 * | 5/2015 | Schmehl | G06Q 30/0255 |
| | | | | 705/14.41 |
| 2015/0355875 | A1 * | 12/2015 | Matsushita | G06F 3/1236 |
| | | | | 358/1.15 |

(Continued)

FOREIGN PATENT DOCUMENTS

JP    2016-167162 A    9/2016

*Primary Examiner* — Cindy Trandai
(74) *Attorney, Agent, or Firm* — Workman Nydegger (57) ABSTRACT

Provided is an information processing apparatus including a beacon acquisition section configured to receive a beacon transmitted by an electronic device, and a processing execution section configured to, in a case where unique information of the electronic device is included in the beacon, perform predetermined processing based on the unique information, and to, in a case where the unique information is not included in the beacon, request the unique information to the electronic device using wireless communication in accordance with a same wireless standard as a wireless standard for the beacon and, upon acquisition of the unique information from the electronic device through the wireless communication, perform the predetermined processing based on the acquired unique information.

3 Claims, 8 Drawing Sheets

(56) References Cited

U.S. PATENT DOCUMENTS

| | | | |
|---|---|---|---|
| 2016/0198290 A1* | 7/2016 | Hong | H04B 17/318 |
| | | | 455/41.2 |
| 2016/0269180 A1 | 9/2016 | Kimura et al. | |
| 2017/0102903 A1* | 4/2017 | Nagasawa | G06F 3/1236 |
| 2018/0020406 A1* | 1/2018 | Ogawa | H04W 4/80 |
| 2018/0048785 A1* | 2/2018 | Shibata | H04W 76/14 |
| 2018/0063364 A1* | 3/2018 | Nagasawa | G06F 3/1204 |
| 2018/0176500 A1* | 6/2018 | Yokomitsu | H04N 5/77 |
| 2018/0248697 A1* | 8/2018 | Shimada | G06F 3/1236 |

* cited by examiner

FIRST BEACON

| | IDENTIFIER | UNIQUE INFORMATION | |
| --- | --- | --- | --- |
| | | STATUS INFORMATION | |

BLE BEACON (iBeacon)

| | FIRST NETWORK INFORMATION | |
|---|---|---|
| | IP ADDRESS | |

FIG. 9

INFORMATION PROCESSING APPARATUS AND NON-TRANSITORY COMPUTER-READABLE MEDIUM RECORDING INFORMATION PROCESSING PROGRAM

BACKGROUND

1. Technical Field

The present invention relates to an information processing apparatus, an information processing method, a non-transitory computer-readable medium recording an information processing program, and a control method for an information processing apparatus.

2. Related Art

Heretofore, there has been known a variety of techniques for allowing a device that performs wireless communication to broadcast a beacon, and allowing other devices to operate in response to the beacon (see, for example, JP-A-2016-167162).

In most cases, the specification of the beacon is determined in a relevant standard. In this case, functions prescribed by the relevant standard are sometimes limited, and thus, it has been desired to implement a variety of functions that are not assumed in the relevant standard.

SUMMARY

According to a first aspect of the invention, an information processing apparatus includes a beacon acquisition section configured to receive a beacon transmitted by an electronic device, and a processing execution section configured to, in the case where unique information of the electronic device is included in the beacon, perform predetermined processing on the basis of the unique information, and to, in the case where the unique information is not included in the beacon, request the unique information to the electronic device using wireless communication in accordance with the same wireless standard as a wireless standard for the beacon and, upon acquisition of the unique information from the electronic device through the wireless communication, perform the predetermined processing on the basis of the acquired unique information. This configuration enables the information processing apparatus to, even when a first electronic device transmits a beacon not including its own first unique information and conforming to a relevant standard, and a second electronic device transmits a beacon including its own second unique information and not conforming to the relevant standard, perform both predetermined processing based on the first unique information and predetermined processing based on the second unique information. Accordingly, even when the information processing apparatus is utilized together with an electronic device that transmits a beacon not including its own unique information and conforming to a relevant standard, the above configuration enables the information processing apparatus to perform predetermined processing that is based on the unique information and that is not assumed in the relevant standard.

In the first aspect of the invention, the unique information may be status information of the electronic device or ability information of the electronic device. Further, the predetermined processing may be processing for displaying the status information on a display portion in the case where the unique information is the status information, and the predetermined processing may be processing based on the ability of the electronic device in the case where the unique information is the ability information. This configuration enables the information processing apparatus to perform predetermined processing based on the content of the unique information.

Further, in the first aspect of the invention, the beacon acquisition section and the processing execution section may be capable of performing wireless communication with the electronic device, the wireless communication being a wireless communication conforming to a Bluetooth Low Energy standard. Further, in the case where the unique information is not included in the beacon, the processing execution section may request the unique information using a scan request or the wireless communication after the establishment of a wireless connection to the electronic device. This configuration enables the information processing apparatus to acquire the unique information from the electronic device using the function prescribed by the BLE standard.

Further, in the first aspect of the invention, the processing execution section may determine that the unique information is included in the beacon in the case where a predetermined identifier indicating that the unique information is included in the beacon is included in the beacon. This configuration facilitates the determination as to whether or not the unique information is included in the beacon.

Further, in the first aspect of the invention, the processing execution section may determine that the unique information is included in the beacon in the case where information written at a predetermined position of the beacon conforms to a writing form for the unique information. This configuration enables the verification as to whether or not the unique information is included in the beacon.

According to a second aspect of the invention, an information processing apparatus that performs wireless communication with an electronic device includes a first wireless communication section configured to perform wireless communication with the electronic device in accordance with a first wireless standard, and a second wireless communication section configured to perform wireless communication with the electronic device in accordance with a second wireless standard prescribing a higher communication speed than a communication speed prescribed by the first wireless standard. Further, in a case where the first wireless communication section has received, from the electronic device, a beacon including first network information associated with the electronic device, the second wireless communication section determines, based on the first network information, whether or not the electronic device and the information processing apparatus belong to a same network. Further, in a case where the electronic device and the information processing apparatus belong to the same network, in response to an event in which an instruction to the electronic device has been input to the information processing apparatus, the second wireless communication section transmits an instruction to the electronic device; while, in a case where the electronic device and the information processing apparatus do not belong to the same network, the first wireless communication section establishes a wireless connection to the electronic device to acquire second network information associated with the electronic device from the electronic device, and the second wireless communication section establishes a wireless connection to the electronic device based on the second network information to, in response to an event in which an instruction to the electronic device has been input to the information processing apparatus, transmit an instruction to the electronic device. This configuration enables the network connection between the electronic device and the information processing apparatus to be automatically established even when the operation in the case where the electronic device and the information processing apparatus do not belong to the same network is not prescribed by a standard, and conforming to the standard disables the execution of the wireless communication therebetween.

BRIEF DESCRIPTION OF THE DRAWINGS

The invention will be described with reference to the accompanying drawings, wherein like numbers reference like elements.

DESCRIPTION OF EXEMPLARY EMBODIMENTS

Here, embodiments of the invention will be described in accordance with the following order:
(1) Configuration of Electronic Device
(2) Configuration of Information Processing Apparatus
(3) Acquisition of Unique Information
(4) Other embodiments

(1) Configuration of Electronic Device

Figure 1:
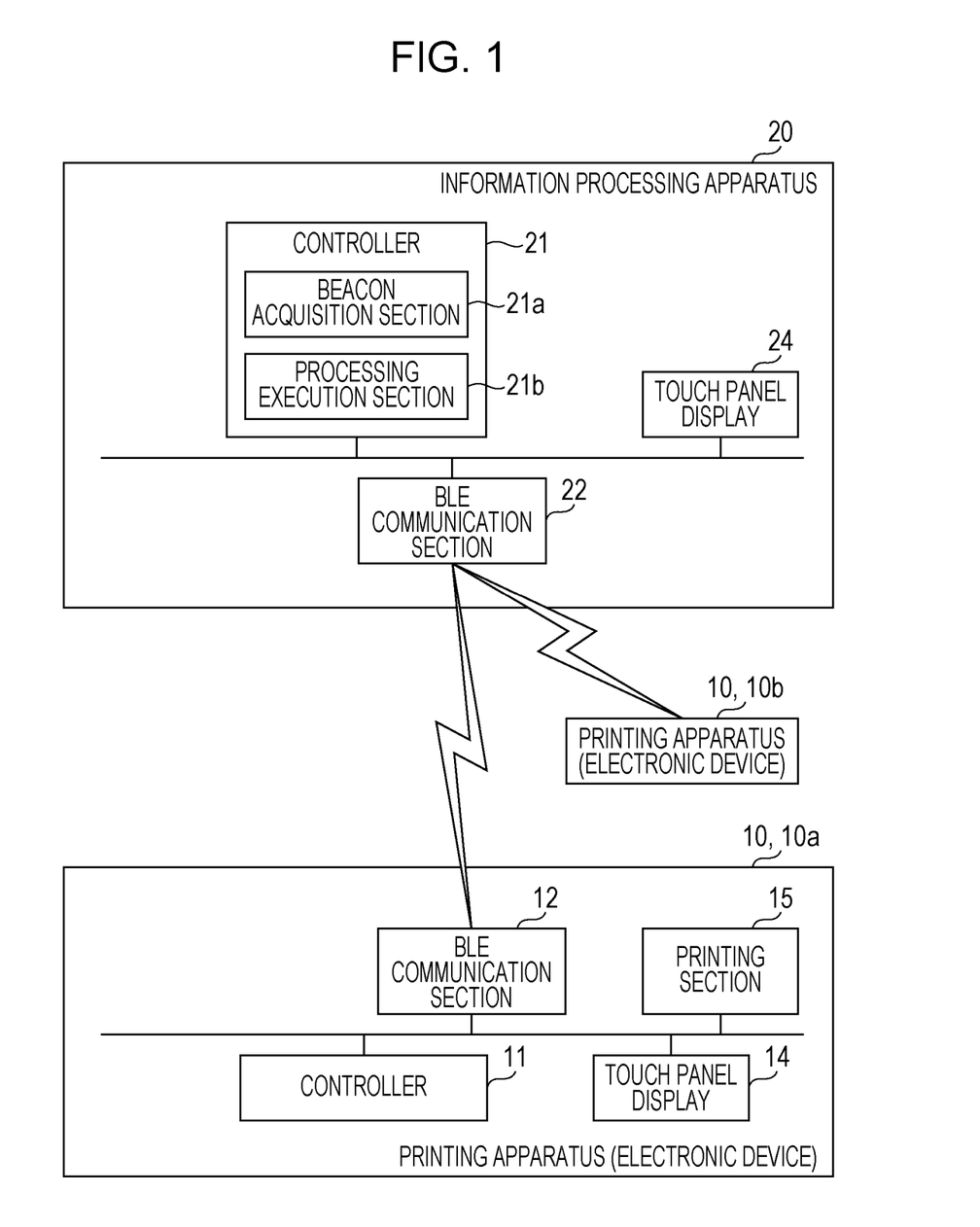
FIG. 1 is a block diagram illustrating the configuration of a first embodiment of the invention.

FIG. 1 is a diagram illustrating a configuration of an information processing apparatus 20, namely, an information processing apparatus according to a first embodiment of the invention. This information processing apparatus 20 is capable of performing wireless communication with printing apparatuses 10. The printing apparatuses 10 serve as electronic devices. Further, the information processing apparatus 20 is capable of, in response to a user's instruction to the information processing apparatus 20, transmitting printing data to any one of the printing apparatuses 10 by means of the wireless communication. Upon acquisition of the printing data from the information processing apparatus 20, each of the printing apparatuses 10 performs printing on the basis of the acquired printing data.

Each of the printing apparatuses 10 includes a controller 11, a BLE communication section 12, a touch panel display 14, and a printing section 15. The BLE communication section 12 implements the function of performing wireless communication conforming to a Bluetooth Low Energy (BLE) standard, and thus is capable of performing wireless communication with each of communication destination devices located within a short range at low power consumption, as compared with wireless communications conforming to other general standards (for example, a Wi-Fi standard and the like). The BLE communication section 12 is configured as, for example, a chip or a module that performs the BLE standard based wireless communication. Note that the BLE communication section 12 may perform wireless communication with each of electronic devices in accordance with Bluetooth v3.0 and below.

The touch panel display 14 is a user interface serving as both a display capable of displaying various kinds of information and a touch panel for detecting each of touches onto the display. The printing section 15 includes an unillustrated transport mechanism for transporting a printing medium, an unillustrated printing mechanism for printing images on the printing medium, and the like. In the present embodiment, the printing section 15 performs printing on the basis of the printing data, which is transmitted from the information processing apparatus 20, and in this case, the relevant printing data may be transmitted in accordance with any wireless standard. For example, the printing data may be transmitted in accordance with the BLE standard, or may be transmitted in accordance with Bluetooth v3.0 and below, the Wi-Fi standard, or the like. The operation of each of the BLE communication section 12, the touch panel 14, and the printing section 15 is controlled by the controller 11.

The controller 11 includes an unillustrated CPU and unillustrated memory, such as ROM and RAM, and is capable of executing programs recorded in the memory. Here, the memory may be also EEPROM or the like, and the same applies hereinafter. That is, the controller 11 executes various kinds of programs to thereby control the BLE communication section 12, the touch panel display 14, and the printing section 15. For example, the controller 11 executes a BLE communication program to thereby control the BLE communication section 12 so as to be capable of performing the BLE standard based wireless communication with the information processing apparatus 20.

Further, the controller 11 executes an image display program to thereby display images on the touch panel display 14, and executes an input reception program to thereby receive user's inputs onto the touch panel display 14. Moreover, the controller 11 executes a printing control program to thereby perform image processing on images indicated by the printing data on the basis of the printing data and control the printing section 15 so as to allow the printing apparatus 15 to perform printing of the images on the printing medium.

The controller 11 in the present embodiment executes various kinds of programs to thereby be capable of implementing various kinds of functions. Here, the programs for implementing the various functions may be mutually independent programs, or may be configured such that a certain program incorporates one or more other programs. For example, the printing control program, which is executed by the controller 11, may incorporate the BLE communication program. No matter how the programs are configured, the controller 11 is capable of performing the various functions by executing the programs. Note that, in the present embodiment, a plurality of kinds of printing apparatuses 10 may exist. For each of the plurality of kinds of printing apparatuses 10, the configuration of a beacon transmitted from the each kind of printing apparatus 10 is different from the configuration of a beacon transmitted from any other one of the plurality of kinds of printing apparatuses 10, while configurations other than the configuration of the beacon are common to those of any other one of the plurality of kinds of printing apparatuses 10. The details of the beacon will be described later. For the configuration illustrated in FIG. 1, when it is necessary to identify two kinds of printing apparatuses 10, one of those two kinds of printing apparatuses 10 will be referred to as a printing apparatus 10a, and the other one of those two kinds of printing apparatuses 10 will be referred to as a printing apparatus 10b.

(2) Configuration of Information Processing Apparatus

The information processing apparatus 20 includes a controller 21, a BLE communication section 22, and a touch panel display 24. The BLE communication section 22 implements the function of performing wireless communication conforming to the BLE standard, and thus is capable of performing wireless communication with each of communication destination devices located within a short range at low power consumption, as compared with wireless communications conforming to other general standards (for example, the Wi-Fi standard and the like). The BLE communication section 22 is configured as, for example, a chip or a module that performs the BLE standard based wireless communication. Note that the BLE communication section 22 may perform wireless communication with each of electronic devices in accordance with Bluetooth v3.0 and below.

The touch panel display 24 is a user interface serving as both a display capable of displaying various kinds of information and a touch panel for detecting each of touches onto the display. The operation of each of the BLE communication section 22 and the touch panel display 24 is controlled by the controller 21.

The controller 21 includes an unillustrated CPU and unillustrated memory, such as ROM and RAM, and is capable of executing programs recorded in the memory. That is, the controller 21 executes various kinds of programs to thereby control the BLE communication section 22 and the touch panel display 24. For example, the controller 21 executes a BLE communication program to thereby control the BLE communication section 22 so as to be capable of performing the BLE standard based wireless communication with each of the printing apparatuses 10.

Moreover, the controller 21 executes a printing program to thereby allow a desired one of the printing apparatuses 10 to perform printing. Specifically, the controller 21 displays candidates for printing target images on the touch panel display 24, and specifies the printing target images on the basis of user's inputs onto the touch panel display 24. The controller 21 transmits printing data indicating the printing target images to the desired one of the printing apparatuses 10 by means of wireless communication. As described above, the standard for transmitting the printing data may be any one of various kinds of standards, such as the BLE standard and the like.

In the present embodiment, in order to enhance convenience at the time of the execution of the printing, the information processing apparatus 20 is capable of acquiring and displaying status information of each of the printing apparatuses 10. Further, the information processing apparatus 20 is capable of, based on the status information, imposing printing conditions, and/or limits on a determination as to whether or not the printing is ready to be started. Here, processing performed on the basis of the status information is called predetermined processing.

In the present embodiment, the status information is information indicating the states of each of the printing apparatuses 10, that is, information indicating a plurality of items and state values each associated with a corresponding one of the plurality of items. The items and the state values may be associated with various configurations, and examples of the items include, but are not limited to, an ink amount for each of colors, the state of a tray for the printing medium, device states, and a maintenance state. Example of the state values include, but are not limited to, a value indicating the ink amount, a value indicating whether or not the tray is set, a value indicating whether or not each of the devices is failed, and a value indicating whether or not the maintenance is being performed.

(3) Acquisition of Unique Information

Hereinafter, such status information as described above will be referred to as unique information because the status information is unique to the printing apparatuses 10, which serve as the electronic devices. The information processing apparatus 20 acquires the unique information using a beacon conforming to the BLE standard. In this case, however, for the printing apparatuses 10, the printing apparatus 10a, namely, a printing apparatus capable of writing its unique information into a beacon for its wireless communication, and the printing apparatus 10b, namely, a printing apparatus incapable of writing its unique information into a beacon for its wireless communication, may exist.

Specifically, a beacon output from the printing apparatus 10a (this beacon being hereinafter referred to as a first beacon) is a general beacon conforming to the BLE standard, and the first beacon includes a portion in which any printing-apparatus manufacturer is able to write information desired by the printing-apparatus manufacturer. Namely, the printing apparatus 10a outputs the first beacon including the relevant portion in which the unique information is written.

On the other hand, a beacon output from the printing apparatus 10b (this beacon being hereinafter referred to as a second beacon) is a beacon conforming to a standard having been prescribed by, for example, an organization different from an organization of printing-apparatus manufactures. Although the second beacon also includes a portion in which any printing-apparatus manufacturer is able to write information desired by the printing-apparatus manufacturer, the amount of information containable in the relevant portion is smaller than the amount of information containable in the portion included in the first beacon, and the size of the relevant portion is not enough for all pieces of unique information of one printing apparatus to be written into the relevant portion. Thus, the printing apparatus 10b is configured to output the second beacon in which the unique information is not written.

As described above, in the present embodiment, a case where a communication destination device of the information processing apparatus 20 is the printing apparatus 10b, which transmits the second beacon in which the unique information is not included, is also assumed. The information processing apparatus 20 is configured to, even in such a case, be capable of performing the predetermined processing using the unique information on the basis of the unique information.

Figure 2:
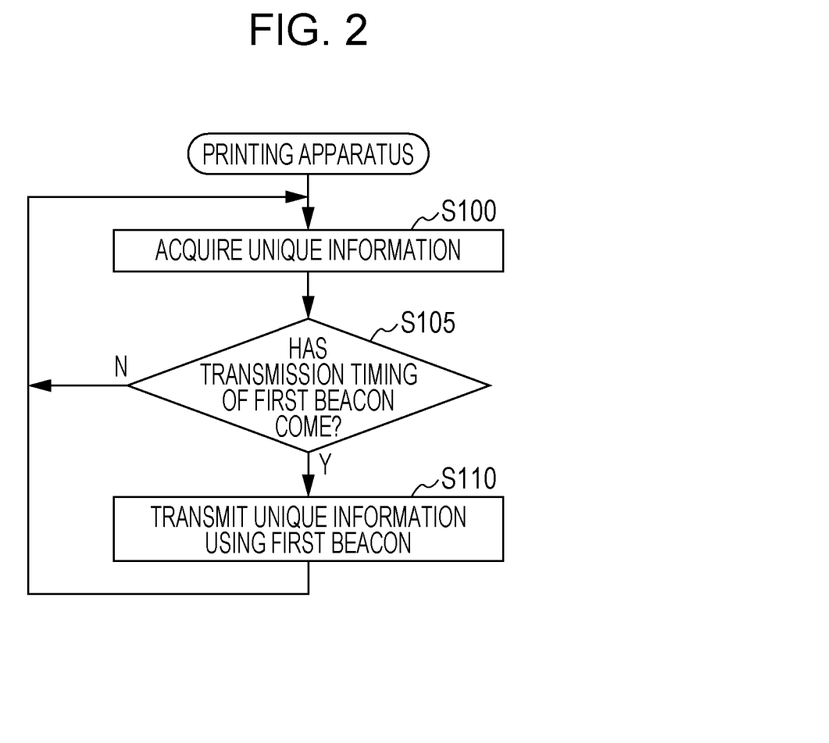
FIG. 2 is a flowchart illustrating processes performed by a first printing apparatus according to the first embodiment.

Hereinafter, processing in which each of the two types of printing apparatuses 10 and the information processing apparatus 20 acquire the unique information in cooperation with each other will be described in detail. FIG. 2 is a flowchart illustrating processing that the printing apparatus 10a performs to transmit its unique information. Upon activation of the printing apparatus 10a, the controller 11 activates processing for the BLE communication and acquires its unique information (step S100). That is, the controller 11 acquires state values each associated with a corresponding one of items constituting the unique information on the basis of the outputs of unillustrated sensors.

Next, the controller 11 determines whether or not the transmission timing of the first beacon has come (step S105). That is, in the present embodiment, it is determined in advance that the first beacon conforming to the BLE standard is periodically broadcasted, and thus, the controller 11 determines whether or not the transmission timing of the relevant first beacon has come. In the case where it has not been determined in step S105 that the transmission timing of the first beacon has come, the controller 21 repeats the processes in step S100 and the step subsequent thereto.

Figure 3:
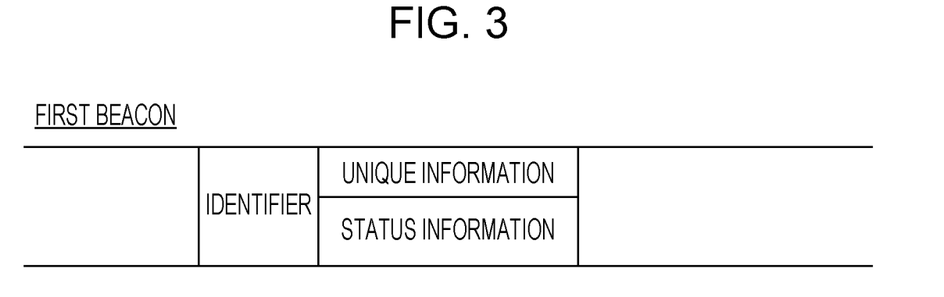
FIG. 3 is a diagram illustrating an example of the configuration of a BLE beacon according to the first embodiment.

In the case where it has been determined in step S105 that the transmission timing of the first beacon has come, the controller 11 controls the BLE communication section 12 to transmit the unique information using the first beacon (step S110). That is, the controller 11 generates the first beacon including the unique information having been acquired in step S100. FIG. 3 is a diagram schematically illustrating a configuration of the first beacon. The first beacon is a beacon conforming to the BLE standard, and in the first beacon, there exist a first portion in which pieces of information each following a predetermined format, such as a header and the like, are written, and a second portion in which optional information is allowed to be written. In the present embodiment, in the second portion, in which optional information is allowed to be written, the unique information and an identifier indicating that a payload is the unique information are written.

Upon generation of the first beacon, the control unit 11 selects a channel, and broadcasts the first beacon using the BLE standard based wireless communication. As a result of this operation, the unique information is transmitted in such a way that every device existing around the printing apparatus 10a and being capable of performing the communication in accordance with the BLE standard is capable of receiving the unique information. Here, the channel may be a predetermined channel, or an uncongested channel (a channel being used by a small number of other printing apparatuses and the like) or the like may be selected.

Figure 4:
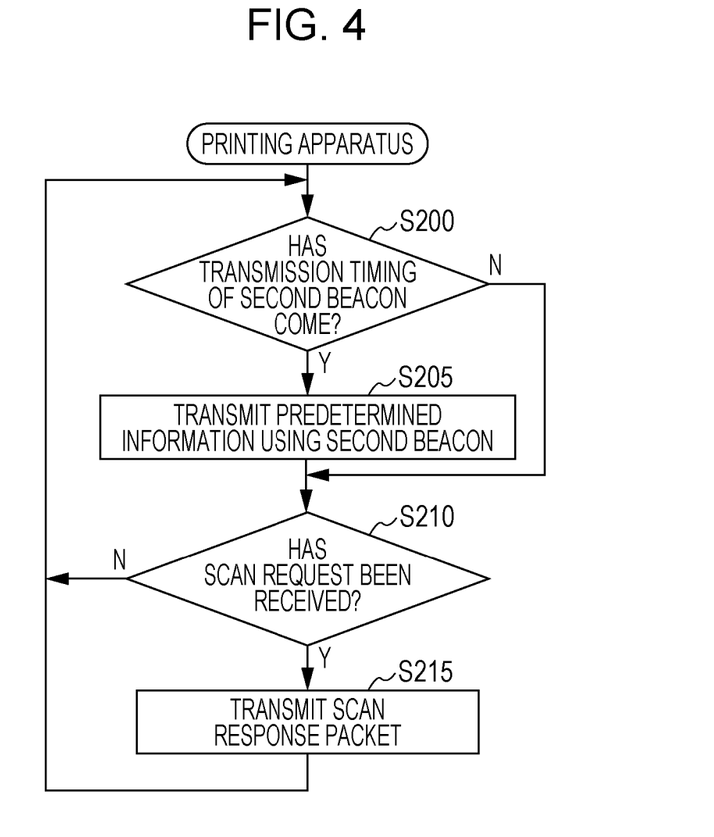
FIG. 4 is a flowchart illustrating processes performed by a second printing apparatus according to the first embodiment.

FIG. 4 is a flowchart illustrating processing that the printing apparatus 10b performs to transmit its unique information. The printing apparatus 10b and the printing apparatus 10a are configurable using the same hardware, and are different from each other in only processes performed by their controllers. Thus, here, a process performed by the printing apparatus 10b will be described using the same reference signs as those for the configuration of the printing apparatus 10a, which is illustrated in FIG. 1.

Upon activation of the printing apparatus 10b, the controller 11 activates processing for the BLE communication and acquires the unique information. Further, the controller 11 notifies the BLE communication section 12 to instruct the BLE communication section 12 to write the acquired unique information into a scan response. Here, in response to an event in which a user has input an instruction for instructing the activation of a BLE communication function by operating the touch panel display 14, the controller 11 may activate the processing for the BLE communication and may acquire the unique information. Upon receipt of the above notification, the BLE communication section 12 generates a scan response packet that, as its payload, includes the unique information, and stores the generated scan response packet into the memory. After the above issue of the notification, the controller 11 instructs the BLE communication section 12 to periodically broadcast (transmit) the second beacon conforming to the BLE standard. Upon receipt of the above instruction from the controller 11, the BLE communication section 12 determines whether or not the transmission timing of the second beacon has come (step S200).

In the case where it has been determined in step S200 that the transmission timing of the second beacon has come, the BLE communication section 12 broadcasts predetermined information using the second beacon (step S205). That is, the BLE communication section 12 generates the second beacon in which the predetermined information that is prescribed in accordance with a standard for the second beacon is written. In the present embodiment, the unique information is not included in the second beacon. Upon generation of the second beacon, the BLE communication section 12 selects a channel and broadcasts the second beacon using the BLE standard based wireless communication.

As a result of this operation, the second beacon is transmitted in such a way that every device existing around the printing apparatus 10b and being capable of the communication in accordance with the BLE standard is capable of receiving the second beacon. Here, the channel may be a predetermined channel, or an uncongested channel (a channel being used by a small number of other printing apparatuses and the like) or the like may be selected. In the case where it has not been determined in step S200 that the transmission timing of the second beacon has come, the BLE communication section 12 repeats the determination in step S200 until it has been determined that the transmission timing of the second beacon has come.

Upon acquisition of the second beacon by the information processing apparatus 20 after the transmission of the second beacon by the printing apparatus 10b, a scan request is output from the information processing apparatus 20 to the printing apparatus 10b (the details of this operation being described later). After the transmission of the second beacon, the BLE communication section 12 determines whether or not the scan request has been received (step S210). Further, in the case where, after the receipt of the scan request from the information processing apparatus 20, it has been determined that the scan request has been received, the BLE communication section 12 transmits the scan response packet having been stored in the memory (which is a scan response packet including, as its payload, the unique information) to the information processing apparatus 20 (step S215).

In the case where, after the transmission of the scan response packet, it has been determined in step S210 that the scan request has not been received, the BLE communication section 12 allows the process flow to return to step S200, and repeatedly performs the processes from step S200 to step S210 until an instruction for instructing the halt of the transmission of the second beacon has been received from the controller 11.

Figure 5:
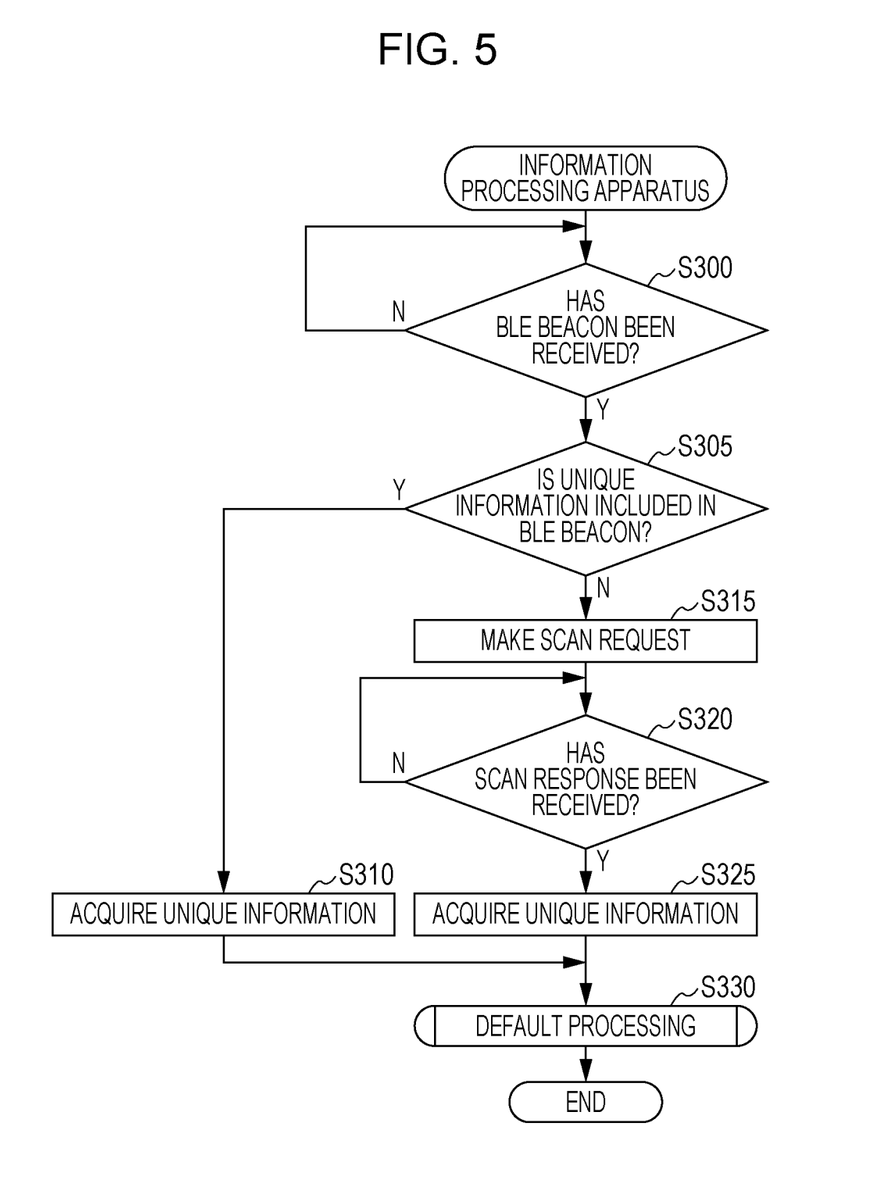
FIG. 5 is a flowchart illustrating processes performed by an information processing apparatus according to the first embodiment.

Each of the printing apparatuses 10 transmits its unique information to the information processing apparatus 20 by performing the processing illustrated in FIG. 2 or the processing illustrated in FIG. 4. FIG. 5 is a flowchart illustrating processing in which, in response to such the each of the printing apparatuses 10, the information processing apparatus 20 acquires the unique information. Upon activation of the information processing apparatus 20, the controller 21 activates processing for the BLE communication, and determines whether or not a BLE beacon (the first beacon or the second beacon) has been received by allowing the beacon acquisition section 21a to perform its function (step S300). That is, the BLE communication section 22 performs scanning of channels 37 to 39 on a frequency band of 2.4 GHz, which are prescribed by the BLE standard, under the control of the controller 21. The controller 21 repeats the process of step S300 until the BLE beacon can be received as the result of the scanning.

In the case where it has been determined in step S300 that the BLE beacon has been received, the controller 21 determines whether or not the unique information is included in the BLE beacon by allowing the processing execution section 21b to perform its function (step S305). That is, in the case where the BLE beacon is the first beacon, as illustrated in FIG. 3, the BLE beacon includes the identifier indicating that the payload is the unique information. Thus, the controller 21 allows the beacon acquisition section 21a to perform its function to thereby refer to a predetermined portion of the received BLE beacon and determine whether or not the identifier (which is, for example, a bit stream representing a specific pattern indicating that the payload is unique information) is written in the predetermined portion. Further, in the case where the identifier is written in the predetermined portion, the controller 21 determines that the unique information is included in the BLE beacon. Note that this configuration that allows the presence or absence of the unique information to be determined on the basis of the presence or absence of the identifier facilitates the determination of the presence or absence of the unique information.

In the case where it has been determined in step S305 that the unique information is included in the BLE beacon, the controller 21 acquires the unique information by allowing the processing execution section 21b to perform its function (step S310). That is, the controller 21 acquires the unique information that is written in the predetermined portion of the beacon having been received in step S300. As a result of this operation, the status information of the printing apparatus 10a, which is a transmission source, is in a state of having been acquired by the information processing apparatus 20.

In contrast, in the case where it has not been determined in step S305 that the unique information is included in the BLE beacon, that is, in the case where the BLE beacon is the second beacon, the controller 21 makes a scan request by allowing the processing execution section 21b to perform its function (step S315). That is, the controller 21 transmits a scan request prescribed by the BLE standard by controlling the BLE communication section 22. Upon receipt of the scan request by the printing apparatus 10b after the transmission of the scan request, the scan response including the unique information is transmitted from the BLE communication section 12 in response to the instruction in step S215.

Thus, the controller 21 waits until the receipt of the scan response by allowing the processing execution section 21b to perform its function and thereby control the BLE communication section 12 (step S320). In the case where it has been determined in step S320 that the scan response has been received, the controller 21 acquires the unique information by allowing the processing execution section 21b to perform its function (step S325). That is, the controller 21 acquires the unique information that is written in the scan response having been received in step S320. As a result of this operation, the status information of the printing apparatus 10b, which is a transmission source, is in a state of having been acquired by the information processing apparatus 20. Accordingly, even when the unique information is not written in the second beacon, this processing having been described above enables the unique information to be acquired from any electronic device in accordance with the function prescribed by the BLE standard.

After the execution of the process in step S310 or the process in step S325, the information processing apparatus 20 performs the predetermined processing on the basis of the acquired unique information (step S330). The above-described configuration enables the information processing apparatus 20 to perform predetermined processing on the basis of unique information in both a first case where the unique information is incorporated in the BLE beacon by a manufacturer of a printing apparatus 10 (in the case of the printing apparatus 10a) and a second case where the unique information is not incorporated in the BLE beacon (in the case of the printing apparatus 10b). Accordingly, even in the case where the printing apparatus 10b, which transmits the second beacon in accordance with a standard having been prescribed by an organization other than an organization of manufacturers of the printing apparatuses 10, is utilized, the information processing apparatus 20 is capable of performing predetermined processing that is not assumed in the standard prescribed by the organization other than the organization of manufacturers of the printing apparatuses 10.

(4) Other Embodiments

The scope of the invention is not limited to the above-described embodiment, and naturally, various modifications can be made within the scope not departing the gist of the invention. For example, in the flowcharts having been illustrated in the above-described embodiment and flowcharts illustrated in an embodiment that will be described later, the interchange of the order of some steps, and the omission, replacement, and the like of some processes may be performed. As an example of such modifications in the flowcharts, an example can be provided in which, for steps S215 and S320, a configuration that, without transmitting the unique information using the scan response, which is a response to the scan request, allows the unique information to be transmitted after the establishment of a connection is employed.

That is, after the transmission of the scan response in response to the scan request, or instead of the scan request and the scan response, a connection on the BLE standard based wireless communication may be established between the printing apparatus 10 and the information processing apparatus 20. In this case, the information processing apparatus 20 requests unique information using the wireless communication after the establishment of the connection, and in response to the relevant request, the printing apparatus 10 transmits its unique information. Further, apparatuses serving as the electronic devices are not limited to the printing apparatus, and may be any other apparatuses, such as a scanner, multi-function device, and the like.

Moreover, when, in step S305, it is determined whether or not the unique information is included in the BLE beacon, a method different from that of the above-described embodiment may be employed. For example, a configuration in which the controller 21 allows the processing execution section 21b to perform its function to thereby determine whether or not information written at a predetermined position of the BLE beacon conforms to a writing form for the unique information may be employed.

In this case, in the case where the information written at the predetermined position conforms to the writing form for the unique information, the controller 21 determines that the unique information is included in the BLE beacon. The writing form may be any one of various forms, and examples of such various forms include, but are not limited to, a form in which a numerical value represented by specific portions (specific bits) inside the beacon is a numerical value falling within a predetermined range, and a form in which a specific pattern corresponding to a specific bit value is arranged in the specific positions.

The beacon acquisition section 21a may be configured in any manner, provided that the beacon acquisition section 21a is capable of acquiring a beacon transmitted by each of electronic devices. That is, the beacon acquisition section 21a may be configured in any manner, provided that the beacon acquisition section 21a is capable of acquiring a beacon that becomes a trigger of starting processing for performing the predetermined processing. The beacon may be configured in any manner, provided that a beacon transmitted from any electronic device can be acquired by the information processing apparatus 20, and the beacon is preferable to be a broadcast packet that is periodically transmitted by each electronic device.

The processing execution section 21b may be configured in any manner, provided that the processing execution section 21b is configured to, in the case where unique information of an electronic device is included in a received beacon, be capable of performing predetermined processing on the basis of the unique information, and to, in the case where the unique information of the electronic device is not included in the received beacon, be capable of requesting the unique information to the electronic device, and then performing predetermined processing on the basis of the unique information having been acquired through the wireless communication. That is, the processing execution section 21b may be configured in any manner, provided that the processing execution section 21b is capable of, in the case where unique information is not push-transmitted from an electronic device, requesting the electronic device to transmit the unique information, and then performing predetermined processing on the basis of the unique information.

The electronic device may be any device having a wireless communication function, and corresponds to any one of various devices other than the above-described printing apparatus, such as a scanner, a multi-function device, and the like. The unique information is sufficient, provided that the unique information is unique to an electronic device, and is directly or indirectly utilized in predetermined processing for the electronic device. The unique information may be any one of various sets of information other than the status information of each of electronic devices in the above-described embodiment. For example, the unique information may be ability information indicating functions implemented in each of a printing apparatus, a scanner, and the like that serve as electronic devices, and any other information can be the unique information.

The predetermined processing may be any processing that directly or indirectly utilizes unique information of an electronic device, and may be any one of various kinds of processing other than the processing for displaying the status information in the above-described embodiment. For example, in the case where the unique information is the ability information of an electronic device, processing for allowing the content of the function performed by the electronic device to be changed in response to the ability of the electronic device (namely, processing based on the ability of an electronic device), or the like, can be exemplified.

Figure 6:
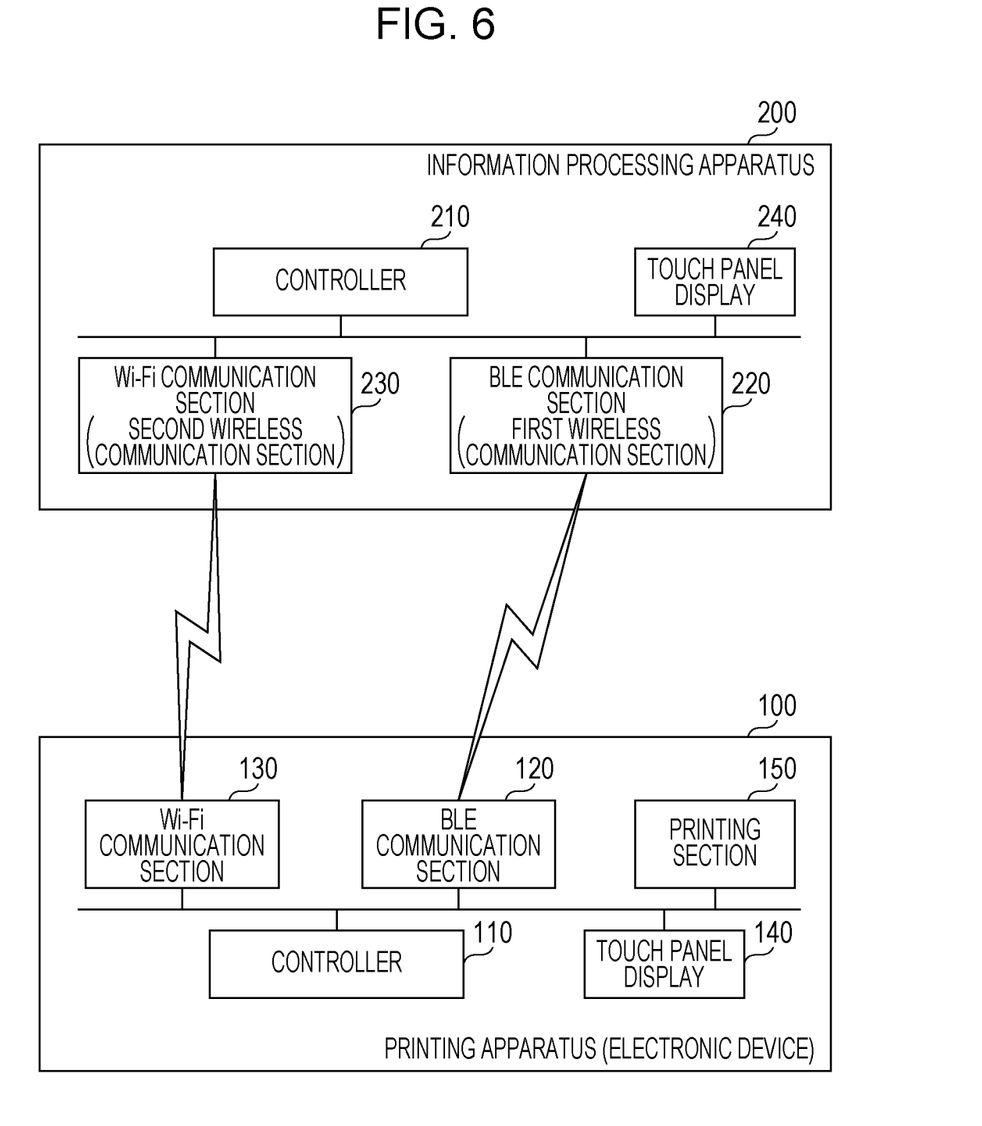
FIG. 6 is a block diagram illustrating the configuration of a second embodiment of the invention.

For the configuration for implementing various functions that are not assumed in a relevant standard, various configurations other than the above-described configuration, in which information that is not prescribed in the relevant standard is transmitted in accordance with a specific standard, can be employed. For example, a configuration that allows operation being not predetermined by a relevant standard to be performed in accordance with a specific standard is applicable. FIG. 6 is a diagram illustrating an information processing apparatus 200, this information processing apparatus 200 including such a configuration.

Specifically, in an example illustrated in FIG. 6, a beacon including network information for a network connection is prescribed by a relevant standard, and the information processing apparatus 200 provides a configuration in which the network information is acquired on the basis of the beacon, and the network connection is established using the acquired network information. In this configuration, however, the operation at the time when the establishment of the network connection using the network information written in the beacon has been failed is not prescribed by the relevant standard. Thus, the information processing apparatus 200 has the function of, even when the establishment of the network connection using the network information written in the beacon has been failed, establishing the network connection by performing operation that is not prescribed by the relevant standard.

Here, an embodiment illustrated in FIG. 6 will be described in the following order.
(4-1) Configuration of Electronic Device
(4-2) Configuration of Information Processing Apparatus
(4-3) Establishment of Connection
(4-1) Configuration of Electronic Device FIG. 6 is a diagram illustrating a configuration of the information processing apparatus 200, according to a second embodiment of the invention. The information processing apparatus 200 is capable of transmitting printing data to a printing apparatus 100 by means of wireless communication. When the printing apparatus 100 has received the printing data, the printing apparatus 100 performs printing on the basis of the printing data.

The printing apparatus 100 and the information processing apparatus 200 are each capable of performing wireless communication in accordance with two kinds of mutually different wireless standards. One of the two kinds of mutually different wireless standards provides a narrower communicable range, a lower communication speed, and smaller power consumption than those of the other one of the two kinds of mutually different wireless standards. In the present embodiment, the one of the two kinds of mutually different wireless standards is a Bluetooth Low Energy (BLE) standard (this Bluetooth being a registered trademark) that is called a short-range wireless standard, and will be hereinafter referred to as a first wireless standard. The other one of the two kinds of mutually different wireless standards is a Wi-Fi standard (Wi-Fi Direct), and will be hereinafter referred to as a second wireless standard. For these standards, under a large number of communication environments, the second wireless standard provides a longer reachable distance of radio waves, a higher communication speed, and larger power consumption than those of the first wireless standard.

The printing apparatus 100 includes a controller 110, a BLE communication section 120, a Wi-Fi communication section 130, a touch panel display 140, and a printing section 150. The BLE communication section 120 is capable of performing wireless communication in accordance with the BLE standard, and thus, provides wireless communication for which, its communication speed is low and its communication destination devices are located within a short range, but its power consumption is low, as compared with wireless communication provided by the Wi-Fi communication section 130. The BLE communication section 120 is configured as, for example, a chip or a module that performs the BLE standard based wireless communication. Further, in the present embodiment, the BLE communication section 120, which is included in the printing apparatus 100, is capable of performing wireless communication using a frequency band of 2.4 GHz. Note that the BLE communication section 120 may also perform wireless communication with each of electronic devices in accordance with Bluetooth v3.0 and below.

The Wi-Fi communication section 130 is capable of performing wireless communication with each of communication destination devices in accordance with the Wi-Fi standard. The Wi-Fi communication section 130 is configured as, for example, a chip or a module that performs the Wi-Fi standard based wireless communication. Further, in the present embodiment, the Wi-Fi communication section 130, which is included in the printing apparatus 100, is capable of performing both wireless communication using a frequency band of 2.4 GHz and wireless communication using a frequency band of 5.0 GHz.

The touch panel display 140 is a user interface serving as both a display capable of displaying various kinds of information and a touch panel for detecting each of touches onto the display. The printing section 150 includes an unillustrated transport mechanism for transporting a printing medium, an unillustrated printing mechanism for printing images on the printing medium, and the like. The operation of each of the BLE communication section 120, the Wi-Fi communication section 130, the touch panel display 140, and the printing section 150 is controlled by the controller 110.

The controller 110 includes an unillustrated CPU and unillustrated memory, such as ROM and RAM, and is capable of executing programs recorded in the memory. Here, the memory may be also EEPROM or the like, and the same applies hereinafter. That is, the controller 110 executes various kinds of programs to thereby control the BLE communication section 120, the Wi-Fi communication section 130, the touch panel display 140, and the printing section 150. For example, the controller 110 executes an image display program to thereby display images on the touch panel display 140, and executes an input reception program to thereby receive user's inputs onto the touch panel display 140. Further, the controller 110 executes a printing control program to thereby perform image processing on images indicated by the printing data on the basis of the printing data and control the printing section 150 so as to allow the printing section 150 to perform printing of the images on the printing medium.

Moreover, the controller 110 executes a BLE communication program to thereby control the BLE communication section 120 so as to be capable of performing the BLE standard based wireless communication with the information processing apparatus 200. The controller 110 executes a Wi-Fi communication program to thereby control the Wi-Fi communication section 130 so as to be capable of performing the Wi-Fi standard based wireless communication with the information processing apparatus 200.

The controller 110 in the present embodiment executes various kinds of programs to thereby be capable of implementing various kinds of functions. Here, the programs for implementing the various functions may be mutually independent programs, or may be configured such that a certain program incorporates one or more other programs. For example, the printing control program, which is executed by the controller 110, may incorporate the BLE communication program and the Wi-Fi communication program. No matter how the programs are configured, the controller 110 is capable of performing the various functions by executing the programs.

(4-2) Configuration of Information Processing Apparatus

The information processing apparatus 200 includes a controller 210, a BLE communication section 220, a Wi-Fi communication section 230, and a touch panel display 240. The BLE communication section 220 is capable of performing wireless communication in accordance with the BLE standard, and thus, provides wireless communication for which, its communication speed is low and its communication destination devices are located within a short range, but its power consumption is low, as compared with wireless communication provided by the Wi-Fi communication section 230. The BLE communication section 220 is configured as, for example, a chip or a module that performs the BLE standard based wireless communication. Further, in the present embodiment, the BLE communication section 220, which is included in the information processing apparatus 200, is capable of performing wireless communication using a frequency band of 2.4 GHz. Note that the function that is executed as the result of the control on the BLE communication section 220 by the controller 210 corresponds to a function of a first wireless communication section in appended claims. In addition, the BLE communication section 220 may also perform wireless communication with each of electronic devices in accordance with Bluetooth v3.0 and below.

The Wi-Fi communication section 230 is capable of performing wireless communication with each of communication destination devices in accordance with the Wi-Fi standard. The Wi-Fi communication section 230 is configured as, for example, a chip or a module that performs the Wi-Fi standard based wireless communication. In the present embodiment, the information processing apparatus 200 is capable of performing both wireless communication using a frequency band of 2.4 GHz and wireless communication using a frequency band of 5.0 GHz. Note that the function that is executed as the result of the control on the Wi-Fi communication section 230 by the controller 210 corresponds to a function of a second wireless communication section in appended claims.

The touch panel display 240 is a user interface serving as both a display capable of displaying various kinds of information and a touch panel for detecting each of touches onto the display. The operation of each of the BLE communication section 220, the Wi-Fi communication section 230, and the touch panel display 240 is controlled by the controller 210.

The controller 210 includes an unillustrated CPU and unillustrated memory, such as ROM and RAM, and is capable of executing programs recorded in the memory. That is, the controller 210 executes various kinds of programs to thereby control the BLE communication section 220, the Wi-Fi communication section 230, and the touch panel display 240. For example, the controller 210 executes a BLE communication program to thereby control the BLE communication section 220 so as to be capable of performing the BLE standard based wireless communication with the printing apparatus 100. The controller 210 executes a Wi-Fi communication program to thereby control the Wi-Fi communication section 230 so as to be capable of performing the Wi-Fi standard based wireless communication with the printing apparatus 100.

Moreover, the controller 210 executes a printing program to thereby allow the printing apparatuses 100 to perform printing. Specifically, the controller 210 displays candidates for a printing target image on the touch panel display 240, and specifies the printing target image on the basis of a user's input onto the touch panel display 240. Further, the controller 210 is capable of generating printing data indicating the printing target, and transmitting the generated printing data to the printing apparatus 100 by means of the Wi-Fi standard based wireless communication.

(4-3) Establishment of Connection

As described above, the information processing apparatus 200 and the printing apparatus 100 perform printing in cooperation with each other by being connected to each other through wireless communication. Further, in the present embodiment, taking into consideration a configuration that enables a large amount of printing data to be transmitted, the printing data is transmitted through the Wi-Fi standard based wireless communication. In order to perform the Wi-Fi standard based wireless communication, the information processing apparatus 200 and the printing apparatus 100 are required to establish the network connection therebetween in advance. The network connection may be established via an unillustrated access point, or may be established in such a way that the printing apparatus 100 serves as an access point (by means of Wi-Fi Direct).

Here, it is assumed a state in which the printing apparatus 100 is capable of serving as an access point by executing SoftAP function (a function of implementing the function of a wireless LAN access point using software). That is, in the printing apparatus 100, network information (Service Set Identifier (SSID), a password, and the like) are already set, and in the information processing apparatus 200, the utilization of the network information enables the establishment of the network connection between the printing apparatus 100 and the information processing apparatus 200.

In this case, however, in order to establish the network connection to the printing apparatus 100 in the information processing apparatus 200, the network information used by the printing apparatus 100 is required to be already set in the information processing apparatus 200 as well (this state being also called a state in which both apparatuses exist on the same network). Thus, the information processing apparatus 200 has the function of automatically establishing the network connection in both a first case where the network information is already set (already known) and a second case where the network information is not yet set.

In the present embodiment, the printing apparatus 100 transmits information for use in the establishment of the network connection to the information processing apparatus 200 using the BLE standard based wireless communication. In order to transmit the relevant information, upon activation of the printing apparatus 100, the controller 110 activates the processing for the BLE communication. As a result of this operation, the printing apparatus 100 enters a state of being capable of performing the BLE standard based wireless communication, and in this state, the printing apparatus 100 performs processing illustrated in FIG. 7 in order to establish a network connection based on the Wi-Fi standard.

Figure 7:
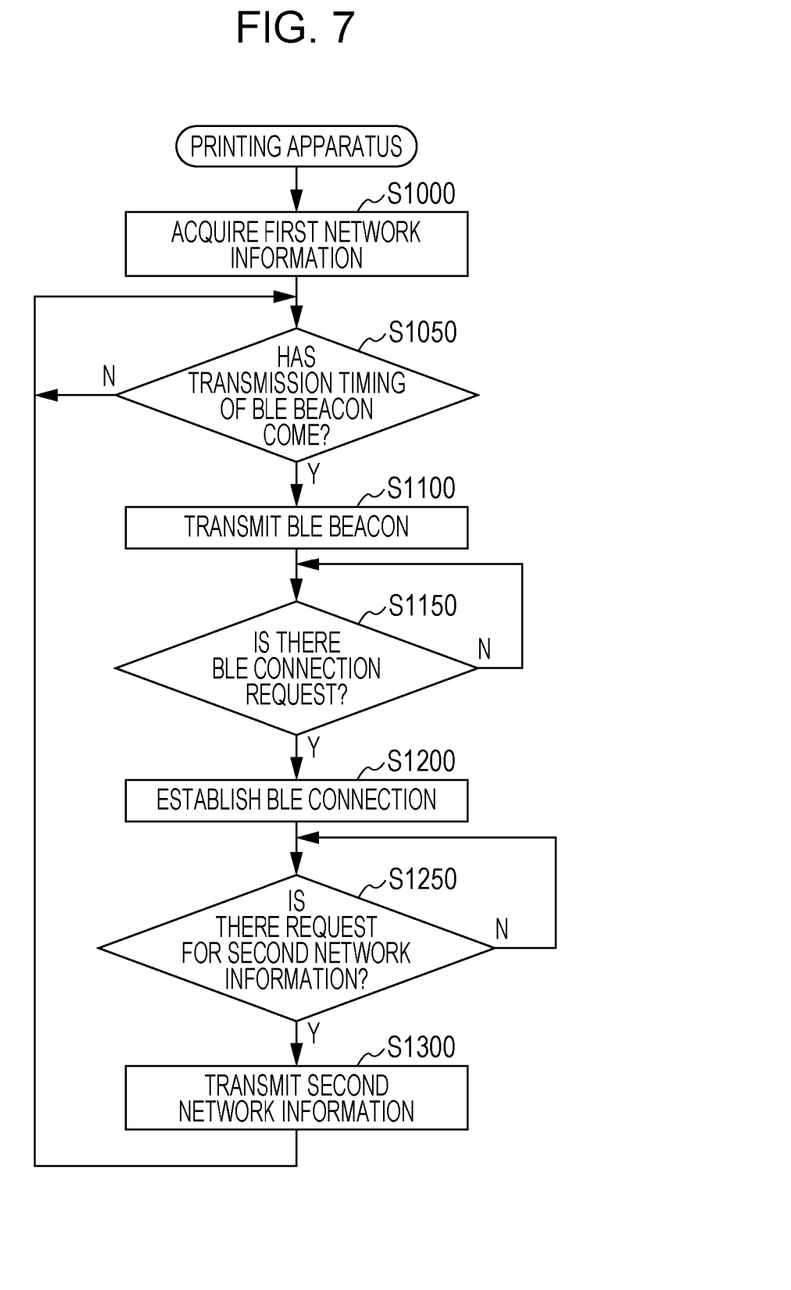
FIG. 7 is a flowchart illustrating processes performed by a printing apparatus according to the second embodiment.

In the present embodiment, the printing apparatus 100 is capable of outputting a BLE beacon conforming to the BLE standard. In the present embodiment, the relevant BLE beacon is a beacon conforming to a standard prescribed by an organization different from an organization of manufacturers of printing apparatuses.

Upon start of the processing illustrated in FIG. 7, the controller 110 acquires first network information (step S1000). The first network information is information for use in determining whether or not the information processing apparatus 200 belongs to the same network as that of the printing apparatus 100. In the present embodiment, the first network information corresponds to an IP address. Thus, in the present embodiment, the controller 110 acquires the IP address of the printing apparatus 100 as the first network information. Further, the controller 110 notifies the acquired first network information to the BLE communication section 120, and thereby instructs the BLE communication section 120 to write the first network information into the BLE beacon.

Next, the controller 110 instructs the BLE communication section 120 to periodically broadcast (transmit) the BLE beacon. Upon receipt of this instruction from the controller 110, the BLE communication section 120 determines whether or not the transmission timing of the BLE beacon has come (step S1050). That is, in the present embodiment, it is determined in advance that a predetermined BLE beacon is periodically broadcasted, and thus, the BLE communication section 120 determines whether or not the transmission timing of the predetermined BLE beacon has come. In the case where it has not been determined in step S1050 that the transmission timing of the BLE beacon has come, the BLE communication section 120 repeats the determination in step S1050.

Figure 8:
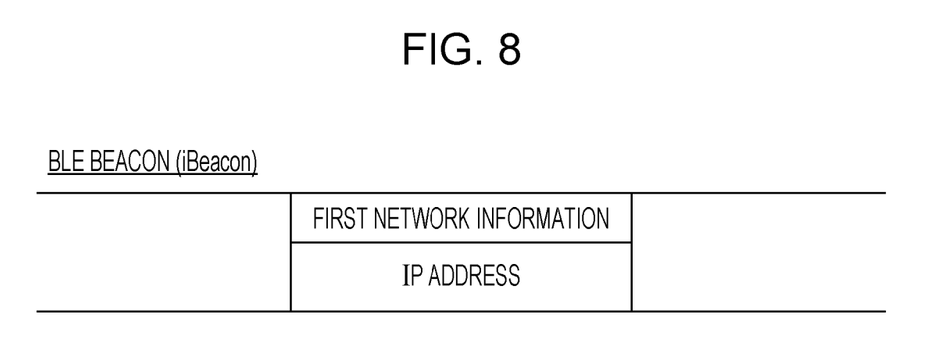
FIG. 8 is a diagram illustrating an example of the configuration of a BLE beacon according to the second embodiment.

In the case where it has been determined in step S1050 that the transmission timing of the BLE beacon has come, the BLE communication section 120 transmits the first network information using the BLE beacon (step S1100). That is, the BLE communication section 120 generates the BLE beacon in which the first network information is written in accordance with the standard. FIG. 8 is a diagram schematically illustrating the relevant BLE beacon. The BLE beacon is defined by not only the BLE standard but also a standard prescribed by an organization different from an organization of manufacturers of printing apparatuses, and in the relevant BLE beacon, there exists a portion in which information following a predetermined format, such as a header and the like, is written. Further, it is determined in advance that an IP address should be written inside a predetermined portion in the relevant format. Thus, the BLE communication section 120 generate the BLE beacon by writing the IP address, which is the first network information, into the relevant predetermined portion.

Upon generation of the BLE beacon, the BLE communication section 120 selects a channel, and broadcasts the BLE beacon. As a result of this operation, the first network information is transmitted in such a way that every device existing around the information processing apparatus 200 and being capable of performing the communication in accordance with the BLE standard is capable of receiving the first network information. Here, the channel may be a predetermined channel, or an uncongested channel (a channel being used by a small number of other information processing apparatuses 200 and the like) or the like may be selected.

When the information processing apparatus 200 has received the BLE beacon after the transmission of the BLE beacon, the information processing apparatus 200 attempts to transmit the Wi-Fi standard based wireless communication on the basis of the first network information, which is written in the relevant BLE beacon. When the Wi-Fi standard based wireless communication has been succeeded through the above process, the controller 110 controls the Wi-Fi communication section 130 to continuously perform the Wi-Fi standard based wireless communication (perform, for example, the acquisition of the printing data and the like).

In contrast, in the case where a Wi-Fi standard based network connection has not been established on the basis of the first network information, the information processing apparatus 200 makes a BLE connection establishment request in accordance with the BLE standard. Thus, the BLE communication section 120 of the printing apparatus 100 waits until the receipt of the BLE connection establishment request (step S1150), and upon receipt of the BLE connection establishment request, the BLE communication section 120 establishes the BLE connection (step S1200). The establishment of the BLE connection is made in accordance with a procedure conforming to the BLE standard.

Upon establishment of the BLE connection, the controller 110 waits until the receipt of a request for second network information (step S1250). The second network information is setting information for use in the establishment of a Wi-Fi standard based network connection, and corresponds to an SSID and a password in the present embodiment.

In the case where it has been determined in step S1250 that the request for the second network information has been received, the controller 110 controls the BLE communication section 120 to transmit the second network information (step S1300). In the present embodiment, the second network information is already set, and is recorded in the unillustrated memory. Thus, the controller 110 refers to the memory to thereby acquire the second network information, and transmits a data packet in which the acquired second network information is written, by means of the BLE standard based wireless communication.

As a result of this operation, the information processing apparatus 200 attempts to establish the connection of the Wi-Fi standard based network connection on the basis of the second network information. In the printing apparatus 100, the network connection based on the second network information is enabled, and thus, the relevant network connection has been successfully established. Thereafter, the controller 110 controls the Wi-Fi communication section 130 to start the Wi-Fi standard based wireless communication (perform, for example, the acquisition of the printing data or the like). Here, when information, such as the second network information and the like, is transmitted, the information may be encrypted.

Figure 9:
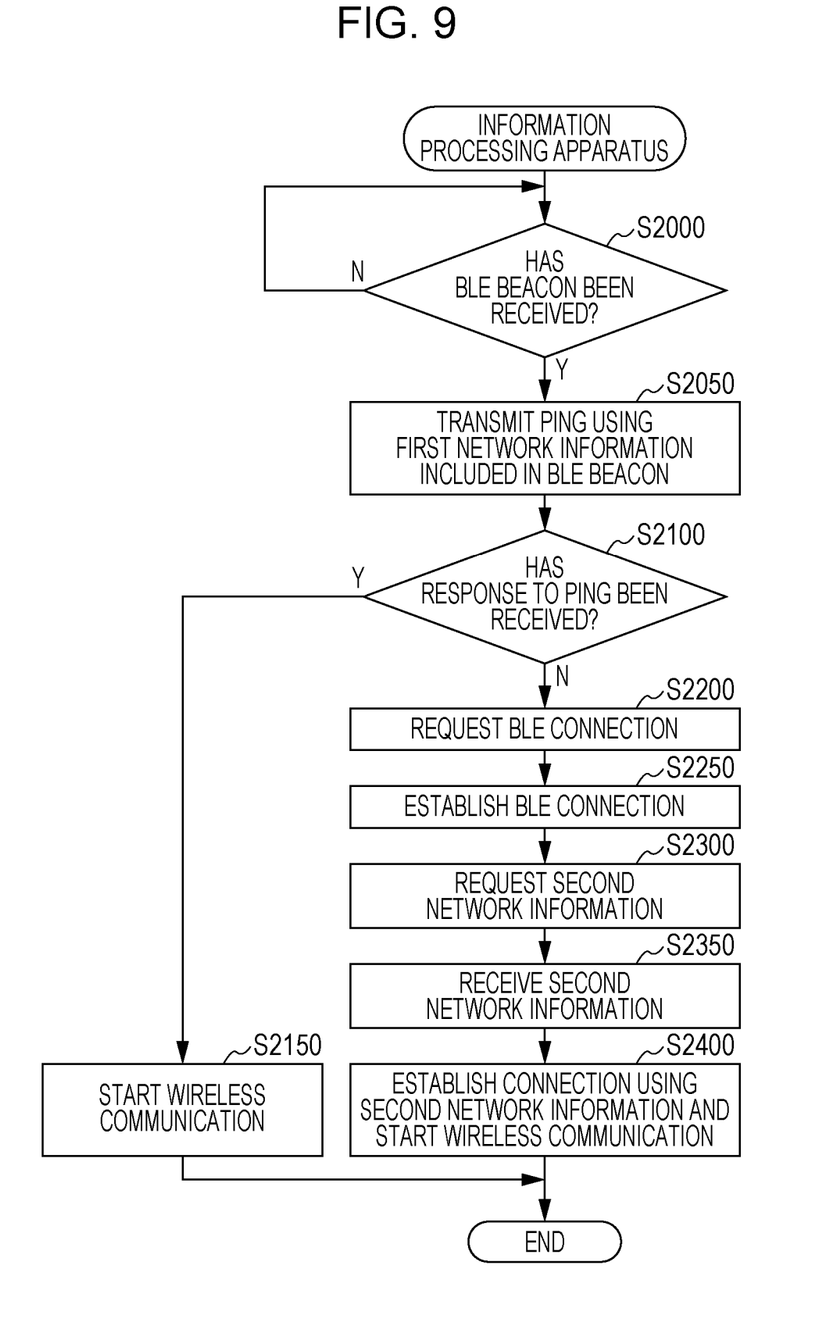
FIG. 9 is a flowchart illustrating processes performed by an information processing apparatus according to the second embodiment.

On the other hand, the information processing apparatus 200 performs processing for establishing the Wi-Fi standard based network connection on the basis of information transmitted by the printing apparatus 100. FIG. 9 is a flowchart illustrating processing for establishing a network connection. In the relevant processing, the controller 210 controls the BLE communication section 220 to wait until the receipt of the BLE beacon (step S2000). That is, under the control of the controller 210, the BLE communication section 220 performs scanning of channels 37 to 39 on the frequency band of 2.4 GHz, which are prescribed by the BLE standard. In the case where, as a result of the scanning, the BLE communication section 220 has successfully received the BLE beacon, the controller 210 determines that the BLE beacon has been received.

In the case where it has been determined in step S2000 that the BLE beacon has been received, the controller 210 transmits PING on the basis of the first network information included in the received BLE beacon (step S2050). That is, the controller 210 acquires the first network information (the IP address of the printing apparatus 100) having been written in the BLE beacon. Further, the controller 210 controls the Wi-Fi communication section 230 to transmit the PING whose destination is determined by the IP address.

In the case where the information processing apparatus 200 and the printing apparatus 100 belong to the same network (in the case where the both apparatuses are performing Wi-Fi communication over a network having been already set), the printing apparatus 100 sends back a response to the PING. In contrast, in the case where the information processing apparatus 200 and the printing apparatus 100 do not belong to the same network, the printing apparatus 100 does not send back the response to the PING, and a timeout occurs.

Thus, the controller 210 determines whether or not the response to the PING has been revived within a predetermined period of time (step S2100). In the case where it has been determined in step S2100 that the response to the PING has been received, the information processing apparatus 200 is in a state in which the wireless communication is ready to be performed using an existing setting. Thus, the controller 210 controls the Wi-Fi communication section 230 to start the wireless communication (step S2150). That is, when the controller 210 has received a user's instruction to the printing apparatus 100 through the touch panel display 240 (the instruction being, for example, an instruction for instructing the start of printing, or the like), the controller 210 controls the Wi-Fi communication section 230 to transmit data for allowing the printing apparatus 100 to perform processing in response to the relevant instruction.

In contrast, in the case where it has not been determined in step S2100 that the response to the PING has been received, the information processing apparatus 200 is in a state in which a network connection setting used by the printing apparatus 100 is not recorded in the information processing apparatus 200. Thus, the controller 210 controls the BLE communication section 220 to make a BLE connection establishment request (step S2200). When the printing apparatus 100 has responded to the connection request in step S1200, the controller 210 establishes the BLE connection (step S2250). This establishment of the BLE connection is made in accordance with a procedure conforming to the BLE standard.

Upon establishment of the BLE connection, the controller 210 controls the BLE communication section 220 to request the second network information (step S2300). At this stage, the printing apparatus 100 is in a state of waiting for the request for the second network information from the information processing apparatus 200 (step S1250). Accordingly, upon execution of the process in step S2300, the printing apparatus 100 transmits the second network information in step S1300. Thus, the information processing apparatus 200 allows the BLE communication section 220 to perform its function to thereby receive the second network information (step S2350). As a result of this operation, the information processing apparatus 200 enters a state in which the SSID and the password as the second network information are acquired.

Next, the controller 210 establishes the connection using the second network information, and then starts the wireless communication (step S2400). That is, the controller 210 controls the Wi-Fi communication section 230 to establish the Wi-Fi standard based network connection on the basis of the SSID and the password as the second network information. Further, the controller 210 controls the Wi-Fi communication section 230 to start the wireless communication. That is, when the controller 210 has received a user's instruction to the printing apparatus 100 through the touch panel display 240 (the instruction being, for example, an instruction for instructing the start of printing, or the like), the controller 210 controls the Wi-Fi communication section 230 to transmit data for allowing the printing apparatus 100 to perform processing in response to the relevant instruction.

The above-described configuration enables the network connection between the printing apparatus 100 and the information processing apparatus 200 to be automatically established even when the operation in the case where the printing apparatus 100 and the information processing apparatus 200 do not belong to the same network is not prescribed by a standard, and conforming to the standard disables the wireless communication therebetween.

Note that, in the above configuration, the first wire communication section may be configured in any manner, provided that the first wireless communication section is capable of performing wireless communication in accordance with a wireless standard that prescribes a higher communication speed than that prescribed by a wireless standard for the second wireless communication section. Accordingly, various configurations other than the configuration of the above-described embodiment, in which the first wireless communication section performs the BLE standard based wireless communication and the second wireless communication section performs the Wi-Fi standard based wireless communication, can be employed. For example, a configuration in which the first wireless communication section performs wireless communication in accordance with a ZigBee standard (ZigBee being a registered trademark) and the second wireless communication section performs wireless communication in accordance with the Wi-Fi standard is applicable. Further, a configuration in which the first wireless communication section performs wireless communication in accordance with the ZigBee standard (ZigBee being a registered trademark) or the BLE standard and the second wireless communication section performs wireless communication in accordance with Bluetooth v3.0 and below is also applicable.

In the above embodiments, examples in which the CPU (processor) included in each of the controller 11, the controller 21, the controller 110, and the controller 210 performs various kinds of processing have been described. Here, in the present specification, the CPU may be constituted of one CPU or a plurality of CPUs, or may be constituted of one integrated circuit (for example, an Application Specific Integrated Circuit (ASIC)) or a plurality of integrated circuits. Further, the CPU may be also constituted of a combination of one CPU or a plurality of CPUs and one integrated circuit or a plurality of integrated circuits.

The entire disclosure of Japanese Patent Application No: 2017-163069, filed Aug. 28, 2017 is expressly incorporated by reference herein in its entirety.

What is claimed is:

1. An information processing apparatus that performs wireless communication with an electronic device, the information processing apparatus comprising:
    a first wireless communication section configured to perform wireless communication with the electronic device in accordance with a first wireless standard; and
    a second wireless communication section configured to perform wireless communication with the electronic device in accordance with a second wireless standard prescribing a higher communication speed than a communication speed prescribed by the first wireless standard,
    wherein, in a case where the first wireless communication section has received, from the electronic device, a beacon including first network information which is an internet protocol (IP) address associated with the electronic device and is not a service set identifier (SSID) and a passowrd, the second wireless communication section determines, based on the first network information, whether or not the electronic device and the information processing apparatus belong to a same network,
    wherein, in a case where the electronic device and the information processing apparatus belong to the same network, in response to an event in which an instruction to the electronic device has been input to the information processing apparatus, the second wireless communication section transmits an instruction to the electronic device the same network, and
    wherein, in a case where the electronic device and the information processing apparatus do not belong to the same network, the first wireless communication section establishes a wireless connection to the electronic device to acquire second network information which includes an SSID and a password associated with the electronic device from the electronic device, and the second wireless communication section establishes a wireless connection to the electronic device based on the second network information to, in response to an event in which an instruction to the electronic device has been input to the information processing apparatus, transmit an instruction to the electronic device.

2. The information processing apparatus according to claim 1, wherein the second network information does not include the IP address associated with the electronic device.

3. The information processing apparatus according to claim 1, wherein the second wireless communication section transmits a ping request based on the IP address included in the received beacon and determines, based on a received respond to the ping request, whether or not the electronic device and the information processing apparatus belong to the same network.

* * * * *